United States Patent
Cai et al.

(10) Patent No.: US 8,524,415 B2
(45) Date of Patent: Sep. 3, 2013

(54) CARBON-TITANIUM OXIDE ELECTROCATALYST SUPPORTS FOR OXYGEN REDUCTION IN PEM FUEL CELLS

(75) Inventors: Mei Cai, Bloomfield Hills, MI (US); Suresh K. Donthu, College Park, MD (US); Martin S. Ruthkosky, Sterling Heights, MI (US); Ion C. Halalay, Grosse Pointe Park, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 46 days.

(21) Appl. No.: 12/897,472

(22) Filed: Oct. 4, 2010

(65) Prior Publication Data
US 2011/0081600 A1    Apr. 7, 2011

Related U.S. Application Data

(63) Continuation of application No. 12/116,388, filed on May 7, 2008.

(60) Provisional application No. 60/938,864, filed on May 18, 2007.

(51) Int. Cl.
  *H01M 8/10*    (2006.01)
  *H01M 4/38*    (2006.01)
  *H01M 4/02*    (2006.01)
  *H01M 4/88*    (2006.01)
  *B01J 23/00*   (2006.01)

(52) U.S. Cl.
  USPC .......... 429/488; 429/485; 429/492; 429/524; 429/528; 502/101; 502/182

(58) Field of Classification Search
  USPC ................ 429/484, 485, 487, 488, 523, 524; 429/528; 502/182, 185, 101
  See application file for complete search history.

(56) References Cited

U.S. PATENT DOCUMENTS

| | | | |
|---|---|---|---|
| 3,964,933 A | 6/1976 | Fung et al. | |
| 2005/0009696 A1 * | 1/2005 | Mao et al. | 502/325 |
| 2006/0099483 A1 | 5/2006 | Min et al. | |
| 2006/0188775 A1 * | 8/2006 | Mance et al. | 429/44 |

FOREIGN PATENT DOCUMENTS

| | | | |
|---|---|---|---|
| JP | 2000243406 A | * | 9/2000 |
| JP | 2004115352 A | | 4/2004 |
| KR | 20060037619 A | | 5/2006 |

OTHER PUBLICATIONS

J. Shim, C.-R. Lee, H.-K. Lee, J.-S. Lee, E. J. Cairns. Electrochemical characteristics of Pt-WO3/C and Pt-TiO2/C electrocatalysts in a polymer electrolyte fuel cell, J. Power Sources 2001, 102, 172-177.*

Korean Office Action KR 10-2007-0095622; Dated Dec. 24, 2009; 2 pages.

Choi et al., Preparation of Anatase Nanostructured TiO2 Particles Using Surfactant-Assisted Sol-Gel Method; Abstracts of Papers, 228th ACS National Meeting, Phil. PA, U.S. Aug. 22-26, 2004 (2004), ENVR-240. American Chemical Society; Washington D.C.; CODEN: 69FTZ8.

Soler-Illia et al., Interactions Between Poly(Ethylene Oxide)-Based Surfactants and Transition Metal Alkoxides: their Role in the Templated Construction of Mesostructured Hybrid Organic-Inorganic Composites; New J. Chem. 2000, 24, 493-499.

Choi et al., Synthesis of Nanocrystalline Photocatalytic TiO2 thin films and particles using sol-gel method modified with nonionic surfactants; Thin Solid Films 510 (2006) 107-114.

Lafont et al., Templated and Non-templated routes to mesoporous TiO2; Studies in Surface Scient and Catalysis 155; 2005; 355-366.

U.S. Appl. No. 11/069,324; Nickel Oxide Nanoparticles as Catalyst Precursor for Hydrogen Production, filed Mar. 1, 2005; First Named Inventor: Mel Cai.

U.S. Appl. No. 11/335,211; Ni and Ni/Nio Core-Shell Nanoparticles, filed Jan. 19, 2006; First Named Inventor: Wenjie Shen.

U.S. Appl. No. 11/488,956; Method of Making Nio and Ni Nanostructures, filed Jul. 19, 2006; First Named Inventor: Wenjie Shen.

U.S. Appl. No. 11/752,954; Carbon and Carbon Composites with Highly Ordered Mesosize Pores, filed May 24, 2007; First Named Inventor: Mei Cai.

U.S. Appl. No. 11/752,968; Making Mesoporous Carbon with Tunable Pore Size, filed May 24, 2007; First Named Inventor: Qingyuan Hu.

U.S. Appl. No. 11/850,860; One-Dimensional Metal and Metal Oxide Nanostructures, filed Sep. 6, 2007; First Named Inventor: Xueliang Sun.

U.S. Appl. No. 11/938,843; Nanowire Supported Catalysts for Fuel Cell Electrodes, filed Nov. 13, 2007; First Named Inventor: Xueliang Sun.

\* cited by examiner

*Primary Examiner* — Carlos Barcena

(74) *Attorney, Agent, or Firm* — BrooksGroup

(57) ABSTRACT

A high surface area support material is formed of an intimate mixture of carbon clusters and titanium oxide clusters. A catalytic metal, such as platinum, is deposited on the support particles and the catalyzed material used as an electrocatalyst in an electrochemical cell such as a PEM fuel cell. The composite material is prepared by thermal decomposition and oxidation of an intimate mixture of a precursor carbon polymer, a titanium alkoxide and a surfactant that serves as a molecular template for the mixed precursors.

13 Claims, 1 Drawing Sheet

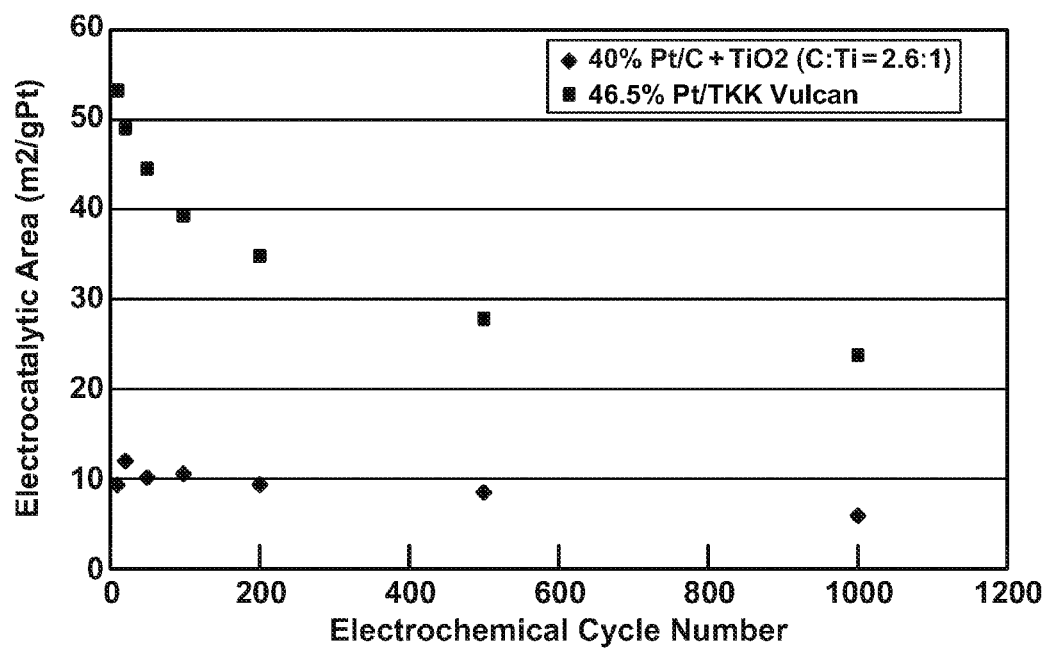

CARBON-TITANIUM OXIDE ELECTROCATALYST SUPPORTS FOR OXYGEN REDUCTION IN PEM FUEL CELLS

This application is a continuation of U.S. application Ser. No. 12/116,388 filed May 7, 2008 and this application claims priority based on provisional application 60/938,864, titled "Carbon-Titanium Oxide Electrocatalyst Supports for Oxygen Reduction in PEM Fuel Cells," filed May 18, 2007 and which is incorporated herein by reference.

TECHNICAL FIELD

This invention pertains to catalyst support materials for use in electrodes of polymer electrolyte membrane (PEM) fuel cells. More specifically, this invention relates to the preparation and use of such catalyst support materials that are a composite of carbon and titanium oxide.

BACKGROUND OF THE INVENTION

PEM fuel cells use electrocatalysts for the oxidation of hydrogen at the anode and reduction of oxygen (in air) at the cathode. Currently, platinum (Pt) and its alloys supported on high surface area carbons are the only feasible electrocatalyst for proton exchange membrane (PEM) fuel cell systems. However, a significant problem hindering large-scale implementation of PEM fuel cell technology is the loss of performance during automotive vehicle cycling and extended operation. Recent investigations of the deterioration of cell performance have revealed that a considerable part of the performance loss is due to the degradation of the electrocatalyst. Although carbon has been considered as a most suitable catalyst support owning to its low cost, good electron conductivity, high surface area, morphology allowing gas diffusion, and chemical stability; corrosion of carbon supports on the cathode side of PEM fuel cells is emerging as a challenging issue for long-term stability of PEM fuel cells.

SUMMARY OF THE INVENTION

This invention addresses the carbon corrosion issue by exploring the use of a porous carbon and titanium oxide composite material as an alternative corrosion-resistant catalyst support material. As will be seen, the titanium oxide is suitably formed by decomposition and oxidation of a titanium alkoxide precursor. This process typically produces titanium dioxide [also sometimes referred to as titania or titanium (IV) oxide] but may produce other titanium oxides such as $Ti_4O_7$. Accordingly, the oxidized titanium will sometimes be identified generically in this application as titanium oxide because it is intended to include any oxide or mixtures of oxides of titanium in the practice of the invention.

Necessary properties of an ideal electrocatalyst support are good electronic conductivity, excellent chemical stability, and a high surface area. Titanium dioxide is a highly stable semiconductor material that shows good electron conductivity after doping and/or reducing treatments. An alternative way to improve the electrical conductivity of titanium dioxide is to introduce conductive carbon into a porous titanium dioxide backbone structure. The homogenous incorporation of the $TiO_2$ and carbon provides a new class of materials that combine the electrical conductivity of carbon and the corrosion resistance of titanium dioxide. To implement such a carbon-titanium dioxide composite as the fuel cell catalyst supports, porosity and high surface areas must be introduced in a controlled manner. In this invention, a method is provided for the synthesis of porous carbon and titanium dioxide (or titanium oxide) composite materials with BET surface area of 300-700 $m^2/g$. Moreover, platinum has been deposited on such support materials and platinized carbon-titanium oxide supports have been tested over many cycles in an electrolytic cell.

In one embodiment, the composite is prepared using a carbon precursor material and a titanium oxide precursor with a suitable polymeric surfactant that facilitates intimate mixing of the precursors. For example, a relatively low molecular weight liquid phenol-formaldehyde polymer may serve as the carbon source and a titanium alkoxide compound as the titania precursor. The precursors are mixed using the surfactant to form an intimate mixture. The mixture is progressively heated under controlled atmospheres to successively hydrolyze titanium alkoxide to titanium oxide, decompose and remove the surfactant, decompose and remove the non-titanium portion of the titanium precursor, and carbonize the carbon polymer. In this process, the titanium precursor compound is oxidized to a titanium oxide, preferably titanium dioxide. A high surface area composite of intimately mixed carbon atoms and titanium oxide molecules is formed. It appears that the carbon and titanium oxide constituents are intermixed at a molecular level as a result of the use of a suitable surfactant in combining the respective precursor materials.

Nanoparticles of a suitable catalyst such as platinum (or a platinum-group metal or an alloy containing such elements) are subsequently deposited on larger particles of this unique composite support material. The catalyzed support material is incorporated into an electrode for an electrochemical cell such as a PEM fuel cell.

Other objects and advantages of the invention will be apparent from a detailed description of preferred embodiment which follows in this specification.

BRIEF DESCRIPTION OF THE DRAWINGS

The drawing FIGURE is a graph of the electrocatalytically active platinum area (i.e., the hydrogen adsorption-desorption (HAD) area) in $m^2/g$ Pt versus electrochemical cycle number for (i) a catalyst of 40% by weight platinum on a carbon-titanium dioxide support (filled diamond data points) and (ii) a catalyst of 47.6% by weight platinum on TKK Vulcan® carbon (filled square data points).

DESCRIPTION OF PREFERRED EMBODIMENTS

In accordance with a preferred embodiment of the invention a catalyst support or substrate material is prepared that is a composite of carbon and titanium oxide. The carbon and titanium oxide are intimately mixed, typically at a close-to-molecular level of mixing.

Composite substrate preparation started with preparation of carbon and titanium dioxide precursors and surfactant solutions separately. The carbon precursor is made by polymerizing phenol and formaldehyde in an alkaline environment at 70° C. to a relatively low molecular weight resole polymer. In accordance with an illustrative example, 3.05 g of phenol was dissolved in 0.56 ml of 20% NaOH aqueous solution while stirring. To this solution, 4.86 ml of formalin solution (37% aqueous formaldehyde) was added drop-wise and stirred at 70° C. for 1 hour. At the end of this polymerization reaction, the solution was cooled to room temperature and the pH adjusted to ~7 using HCl solution. Finally the carbon precursor was placed in a vacuum dryer at room temperature for 24 hours to remove water. The "dried" product was a thickened solution having "honey-like" viscosity. As will be disclosed, the material of the solution will be combined with other material and carbonized to produce carbon-titanium dioxide composite. Assuming a fifty percent loss of carbon during such carbonization, it was estimated that this material would yield about 0.13 moles of carbon.

A titanium dioxide precursor is prepared by hydrolyzing titanium isopropoxide in an acidic ethanol solution. 1.68 ml of HCl is first mixed with 164.6 ml of ethanol and then 13.8 ml of titanium isopropoxide is added drop-wise while the entire solution is stirred using a magnetic stirrer-bar. Finally 8.9 ml of water is added to the solution. This composition is expected to produce 0.05 moles of Ti in the final product.

A surfactant composition that was a block copolymer of ethylene oxide (EO)-propylene oxide (PO)-ethylene oxide (EO) was used as a structure directing agent. The material was a BASF® Tri-block co-polymer, F127 (EO106 PO70 EO106). A surfactant solution was prepared by sonicating 2.5 g of F127 in 50 ml of ethanol. This amount is chosen to give 50 g of surfactant for 1 mole of Ti in the final substrate. The surfactant was selected to intimately disperse the carbon-containing polymer and titanium-containing compound in the water and ethanol medium.

After the individual solutions were made, they were mixed together while stirring. The mixed solution immediately turned orange and a precipitate was formed. This orange liquid with precipitate was heated at 50° C. for a day to evaporate the solvent. The titanium precursor is hydrolyzed to titanium oxide during this heating. The dried composite product of phenolic polymer-titanium compound-surfactant was then heated in $N_2$ from ambient temperature to 350° C. over 6 hours to decompose the surfactant, volatilize its decomposition products and those of the titanium precursor constituents, and remove them. The residue was then heated in nitrogen at 900° C. for 4 hours to carbonize the phenolic resin. The carbon-titanium oxide product had a C to Ti ratio of about 2.6.

Substrates with different ratios of C/Ti are produced by fixing the ratio of titanium dioxide precursor to surfactant solution while changing the amount of carbon precursor added to the titanium dioxide precursor.

Platinization Of Composite Substrate

Platinum catalyst material has been deposited on the carbon-titanium oxide substrates using two different routes for illustration. One route involved using diamineplatinum (II) nitrite as platinum source and hydrazine as reducing agent. A second route used hexachloroplatinic acid as the platinum source and ethylene glycol as reducing agent solvent-dispersant.

Catalyst Deposition Route I:

About 0.5 g of carbon-titanium oxide substrate was finely crushed in a mortar and dispersed in 250 ml of water at 80° C. using a probe sonicator. Simultaneously, 1.21 g of diamineplatinum (II) nitrite was dissolved in 100 ml of water at 80° C. Subsequently, the substrate dispersion and platinum precursor solution was mixed and the pH was adjusted to 3 using glacial acetic acid with continuous stirring. The dispersion was maintained at a temperature between 80 and 85° C. Once the temperature and pH were stabilized, carbon monoxide was bubbled through this solution. Finally 0.42 ml of hydrazine in 5 ml of $H_2O$ solution was added drop-wise to the dispersion to reduce platinum. Addition of hydrazine solution tended to increase the dispersion pH above 3. Therefore acetic acid was added accordingly to maintain the pH just under 3. After 2 hours the entire solution is cooled to room temperature, filtered, washed with de-ionized water and dried in vacuum oven at 50° C. This composition was formulated to produce approximately a 40 wt % of platinum loading on a relatively high surface area composite of carbon and titanium dioxide.

Catalyst Deposition Route II:

Prior to platinization, the carbon-titanium dioxide substrate material was pretreated by washing in 2N HCl for 30 minutes and then in 5N $HNO_3$ for 30 minutes. The carbon-titanium dioxide substrate was washed with water after each acid wash and then dried in vacuum oven at 50° C. overnight. Such acid pretreatment was found to increase the surface area of the composite catalyst support material by as much as 25% and may have produced some oxidation of the substrate surface.

One gram of pretreated substrate was dispersed in 200 ml of ethylene glycol by sonicating for 30 minutes. 1.8 g of hexachloroplatinic acid ($H_2PtCl_6 \cdot 6H_2O$) was dissolved in 50 ml of ethylene glycol. The substrate solution and platinum precursor solutions were mixed and stirred for an additional 20 minutes. Sodium hydroxide was added to the mixed solution to raise the pH to about 13 and stirred for an additional 2 hours. Then the solution was refluxed by heating in an oil bath at 135° C. for 3 hours. Subsequently, the dispersion was cooled to room temperature, 150 ml of water was added and the pH was adjusted to 3 using HCl. The dispersion was stirred for another 2 hours before filtering and washing with DI water. The platinized powder was then dried in vacuum oven at 50° C. overnight and heat-treated at 500° C. for 2 hours in $H_2$.

Electrochemical Tests

The electrocatalyst prepared with carbon-titanium dioxide composite was tested in an electrochemical cell under simulated PEM fuel cell conditions. The electrochemical tests were performed at 80° C. in an aqueous 0.5M $H_2SO_4$ solution, using 3-electrode cells de-aerated with argon gas. Each reference electrode consisted of a hydrogen gas bubble sealed in a glass tube, in contact with a platinum wire. The counter-electrode consisted of an ultra high purity (99.999%) carbon rod, coated with a mixture of graphitized carbon and Nafion®. Each working electrode was made of a 1 mm diameter gold wire welded to a gold disk 12 mm in diameter, onto which a 9 mm diameter disk of the active material was pressed at room temperature under 1 metric ton pressure. Each electrode coating was made through a roll-and-paste technique, using 10% Teflon by weight as a binder.

In one group of evaluation tests the active material was the composite carbon-titanium dioxide support material of this invention. Platinum was deposited on the support material so that platinum particles comprised about forty percent by weight of the catalyst-composite support combination. Identical cycling tests were performed on a commercial carbon-supported platinum catalyst, Vulcan® TKK, comprising about 47.6% by weight platinum. The tests with the commercial catalyst were for purposes of comparison.

The potential cycling experiments, which provide information about corrosion during start-stop and load cycling of the fuel cell, were performed at 10 mV/s over the duration of 1000 cycles. Two voltammograms each were recorded at 2 mV/s starting one cycle prior to, and including, cycles 10, 20, 50, 100, 200, 500 and 1000, in order to determine the hydrogen absorption-desorption (HAD) area. The HAD area as a function of cycle number was then determined from the integrated charge passed between 0.05 V and 0.35 V during the cathodic (decreasing voltage) portion of the slow potential scans. Mass changes were determined through weighing with an analytical balance before and after potential cycling. Weighing of a sample after potential cycling required rinsing and soaking of the working electrode in deionized water for 1 hour, with two changes of the water for the soaking and periodic stirring, followed by vacuum drying in an oven at 100° C. for 1 hour and subsequent weighing of the sample with an analytical balance.

Table 1 shows the mass loss of catalyst support at the end of the 1000 cycles is much lower for the Pt/(C+TiO$_2$) electrocatalyst when compared to the carbon-based commercial catalyst. The drawing FIGURE also shows that the rate of Pt electro active surface area loss in Pt/(C+TiO$_2$) electrocatalyst is significantly reduced when compared to the Pt/carbon commercial electrocatalyst as the cycles progressed.

TABLE 1

Mass Loss of the Catalyst Support

| Pt contents (wt %) | Catalyst Support Type | Mass Loss, % |
|---|---|---|
| 47.6 | Vulcan carbon (commercial) | −15.5 |
| 40 | C—TiO$_2$ composite | −0.5 |

Electrical conductivity of the substrates was determined by compressing substrate powder between two electrodes in a test fixture to 5000 psi. An electrical current was passed through the powder and the voltage was measured at two points separated at a predetermined distance. The resulting voltage was used to calculate the resistivity of the substrate in Ω-cm.

Comparative resistivities of the composite substrates are shown in Table 2. Results are normalized to a carbon substrate prepared in the absence of titanium oxides. The substrates show an increase in conductivity (lower resistivity) as the carbon content increases. Based on surface area analyses, the optimal substrate, TiO$_x$C$_{2.6}$, shows a resistivity that is 2.5 times less than that of the prepared carbon substrate and one order of magnitude greater than that of Vulcan XC-72 benchmark material. Thus, the mixture of carbon and titanium oxide(e) provides a fine combination of conductivity and low mass loss in potential cycling testing.

TABLE 2

Relative Resitivities of C—Ti Composite Substrates in Ω-cm.

| Carbon | TiO$_x$C$_{0.65}$ | TiO$_x$C$_{1.3}$ | TiO$_x$C$_{2.6}$ | TiO$_x$ | Vulcan |
|---|---|---|---|---|---|
| 1 | 1.7 | 0.9 | 0.4 | 3.3 | 0.03 |

Practices of the invention have been illustrated by some preferred embodiments which are not intended to limit the scope of the invention

The invention claimed is:

1. A method comprising:
   forming a dispersion of a carbonizable polymer, a surfactant, and titanium alkoxide in a liquid medium;
   evaporating the liquid medium to leave a material characterized by inter-dispersed clusters of carbon based polymer, surfactant, and titanium oxide;
   heating the material to progressively decompose and volatilize the surfactant and alkoxide residue;
   further heating the material to carbonize the carbonizable polymer, and to yield a porous composite, processing the composite to produce a carbon-titanium oxide substrate material, the proportions of carbonizable polymer and titanium alkoxide being determined to provide a desired carbon to titanium ratio in the carbon-titanium oxide substrate material and depositing platinum on the substrate material, wherein the carbon-titanium oxide substrate material comprises at least on of TiO$_x$C$_{0.65}$, TiO$_x$C$_{1.3}$ or TiO$_x$C$_{2.6}$.

2. A method as recited in claim 1 in which the carbonizable polymer is a phenol-formaldehyde polymer.

3. A method as recited in claim 1 in which the liquid medium comprises water and an alcohol.

4. A method as recited in claim 1 in which the surfactant is a block copolymer comprising polypropylene oxide central blocks and polyethylene oxide end blocks.

5. A method as recited in claim 1 in which the surfactant is a block copolymer comprising polypropylene oxide central blocks and polyethylene oxide end blocks and the liquid medium comprises water and an alcohol.

6. A method as set forth in claim 1 wherein the depositing platinum comprises using diamine platinum (II) nitrite as a platinum source and hydrazine as a reducing agent.

7. A method as set forth in claim 1 wherein the depositing platinum comprises using hexachloroplatinic acid as a platinum source and ethylene glycol as a reducing agent solvent dispersant.

8. A method as set forth in claim 1 further comprising forming an electrode for the reduction of oxygen from the carbon-titanium oxide substrate material having platinum deposited thereon.

9. A method as set forth in claim 8 further comprising a polymer electrolyte membrane, and deposing the electrode on the membrane.

10. A method as set forth in claim 1 wherein the carbon-titanium oxide substrate material consists essentially of at least one of TiO$_x$C$_{0.65}$, TiO$_x$C$_{1.3}$ or TiO$_x$C$_{2.6}$.

11. A method as set forth in claim 1, wherein said porous composite has a BET surface area of 300-700 m$^2$/g.

12. A method comprising:
   forming a dispersion of a carbonizable polymer, a surfactant, and titanium alkoxide in a liquid medium;
   evaporating the liquid medium to leave a material characterized by inter-dispersed clusters of carbon based polymer, surfactant, and titanium oxide;
   heating the material to progressively decompose and volatilize the surfactant and alkoxide residue;
   further heating the material to carbonize the carbonizable polymer, and to yield a porous composite of inter-dispersed carbon and titanium oxide, the proportions of carbonizable polymer and titanium alkoxide being determined to provide a desired carbon to titanium ratio in the porous composite, crushing the composite to particles of catalyst support material having a BET surface area of 300-700 m$^2$/g and the particles comprising at least one of-TiO$_x$C$_{0.65}$, TiO$_x$C$_{1.3}$ or TiO$_x$C$_{2.6}$.

13. A method as set forth in claim 12 wherein the carbon-titanium oxide substrate material consists essentially of at least one of TiO$_x$C$_{0.65}$, TiO$_x$C$_{1.3}$ or TiO$_x$C$_{2.6}$.

* * * * *